United States Patent [19]

Broberg

[11] 4,440,595
[45] Apr. 3, 1984

[54] APPARATUS FOR CONCENTRATING MINERAL ACIDS

[75] Inventor: Hans Broberg, Karlskoga, Sweden

[73] Assignee: Aktiebolaget Bofors, Bofors, Sweden

[21] Appl. No.: 354,403

[22] Filed: Mar. 3, 1982

[30] Foreign Application Priority Data

Mar. 16, 1981 [SE] Sweden ............................... 8101648

[51] Int. Cl.³ .......................... B01D 1/10; B01D 1/14; B01D 1/22
[52] U.S. Cl. ................................ 159/13 A; 159/13 C; 159/27 D; 159/DIG. 19
[58] Field of Search ............... 23/306, 307; 159/13 A, 159/13 C, 27 D, 49, DIG. 19

[56] References Cited

U.S. PATENT DOCUMENTS

| 3,294,650 | 12/1966 | Manteufel | 23/306 |
| 4,014,735 | 3/1977 | Guth et al. | 23/306 |
| 4,138,309 | 2/1979 | Kuhnlein et al. | 159/13 A |
| 4,243,477 | 1/1981 | Broberg et al. | 159/13 A |
| 4,329,155 | 5/1982 | Schlegel | 23/306 |

FOREIGN PATENT DOCUMENTS

| 684939 | 4/1964 | Canada | 159/49 |
| 1769439 | 4/1972 | Fed. Rep. of Germany. | |
| 7807069 | 11/1980 | Sweden. | |
| 341882 | 1/1931 | United Kingdom. | |
| 1111407 | 4/1968 | United Kingdom. | |
| 1218595 | 1/1971 | United Kingdom | 159/13 A |
| 1347354 | 2/1974 | United Kingdom. | |
| 2023437 | 1/1980 | United Kingdom. | |

Primary Examiner—Bradley Garris
Attorney, Agent, or Firm—Pollock, Vande Sande & Priddy

[57] ABSTRACT

One or more quartz tubes (1) are utilized in apparatus for the concentration of an acid. Each quartz tube is heated from the outside, and the acid is fed in at the upper part of each tube. Concentrated acid is drained off from the lower part of each tube into a vessel (3) and the vapors driven off from the acid during the concentrating rise inside each tube, and are led off from the upper part thereof. Inside each tube, the acid first passes through a rectification zone (A) in the upper part of the tube, and then passes through a liquid film zone and a reservoir zone.

19 Claims, 9 Drawing Figures

A —·— A

APPARATUS FOR CONCENTRATING MINERAL ACIDS

TECHNICAL FIELD

This invention relates to a method for the concentration of mineral acids, and the utilization of one or more externally heatable, such as by means of for example stack gases, quartz tubes, wherein the acid to be concentrated is fed in at the upper end of the respective tube or tubes and the concentrated acid is drained off from the lower end of the tube or tubes into a vessel. Those vapors which rise from the acid during the concentration process are led off via the upper end of the tube or tubes. The invention also includes apparatus for carrying out the above-discussed method.

BACKGROUND ART

It is already known that, for example sulphuric acid can be concentrated in apparatus consisting of an oven through which one or more long quartz tubes are located vertically. The acid is passed vertically downwards through the tube or tubes which are heated externally by means of hot stack gases generated in the oven and brought into direct contact with the tube or tubes so that heat is effectively transferred to the downward flowing acid. With regard to this method of heating it is consequently of great importance that constant heating of and conduction in the tube or tubes be achieved in order to avoid the occurrence of hot patches or sections of the tube or tubes during the concentration process as tensile strains and breaks or cracks in the tube or tubes can thereby be caused.

DISCLOSURE OF THE INVENTION

Technical Problems

With the previously known methods and apparatus for the concentration and possible purification of mineral acids problems such as the forming of encrustations and the partial overheating of the quartz tubes which greatly reduce their life span can occur.

In addition it is desirable that the loss of mineral acids during the process of concentration should be limited as much as possible, which is why the vapor leaving the top of each quartz tube must contain as little acid as possible. In this connection it can be advantageous that the said vapor be of as low temperature as possible as the vapor or gas in question will therefor be easier to transport in for example glass tubes which have the advantage of being non-corrosive.

SOLUTION

The purpose of this invention is to create a method and apparatus which among other things solves those problems stated above. The present invention comprises passing the acid through a rectification zone preferably containing packings, located at the upper end of the tube, during the passage of the acid down through each quartz tube. In the tube the supply of acid and the speed of the rising vapor in the said zone, together with the heating acid and vapour temperatures are so selected that the inner surface of the zone is kept well-moistened by acid. The flow of the vapors rising from below the rectification zone in a liquid film zone, which is located under, and directly connected to the rectification zone, and which extends along the central section of the tube, is caused to be turbulent by means of one or more rotary devices. This vapor flow, in conjunction with the drops of acid from the rectification zone, cause disintegration of the drops and throw such against the inner surface of the tube within the liquid film zone. In order to limit the temperature within the liquid film zone, the speed and turbulence of the rising vapors, together with the acid supply, are selected so that in the liquid film zone the acid drops are disintegrated and together with any acid running down the inner surface of the liquid film zone from the rectification zone, form an essentially unbroken liquid film over the inner surface of the liquid film zone. The acid flowing downwards from the liquid film zone is collected in a reservoir connected to the liquid film zone and extending along the lower part of the quartz tube. Further, the collected acid is circulated while being boiled, by means of one or more circulatory devices fitted in the reservoir while simultaneously, the surplus concentrated acid occurring in the reservoir is led off via an overflow to a vessel. Forthcoming elaborations on the said described method more precisely establish how the acid concentration takes place in a particular zone. Apparatus for carrying out the said method is principally characterized in that each particular quartz tube is arranged to function with an upper rectification zone preferably consisting of packings, a central liquid film zone, and a lower reservoir zone. The rectification zone is arranged so that dependent on the quantity of supplied acid and the speed of the rising vapors within it, together with the heating acid and vapor temperatures it will function with an inner surface well moistened by acid. Also in the liquid film zone is arranged one or more rotary devices which cause the flow of the rising vapors to be turbulent within it so that they due to their turbulence and speed of ascent cause such a joint action with the acid dripping from the rectification zone that the acid drops disintegrate and are thrown against the inner surface of the liquid film zone where they further disintegrate and unite with the acid running down the latter mentioned inner surface from the rectification zone to form an essentially continuous downward running liquid film. The reservoir zone collects the acid running down from the liquid film zone and in which are located one or more circulatory devices which while the collected acid is being boiled cause a controlled circulation of the said collected acid. The reservoir zone is also fitted with an overflow by which the surplus acid is led to a vessel. Discussions hereinbelow concerning the apparatus according to the invention establish that inside each quartz tube is utilized an inner central quartz tube which extends from the said lower part of the quartz tube up into the liquid film zone to form a lower support for the layer of packings in the rectification zone. The said central quartz tube also supports the rotary devices in the liquid film zone and the circulatory devices in the reservoir zone. Discussions hereinbelow also state in detail designs for the rotary and circulatory devices. Through the construction using a central quartz tube, quartz tube 1 is considered to form an outer tube and the central quartz tube to form an inner tube. In one variation of the invention each of the three said zones extends to one third of the length of each quartz tube. The overflow is formed also with the help of the central quartz tube which for this purpose is equipped with several side outlets via which the surplus acid is led along an inner channel at the lower end of the tube to the said vessel. A preferred variation has consequently a further rectification zone located in the inner channel of the central quartz tube.

ADVANTAGES

By means of divisions in the three above-mentioned zones an optimal concentration process of the acid flowing through the quartz tube can be achieved. Due to the rectification zone in the upper part of the quartz tube the loss of acid can be limited at the same time as the temperature of the departing vapors can be kept down so as to enable transportation in for example galss pipes. The temperature within the rectification zone can be kept relatively low and the desired moistening of the inner surface of the tube in the rectifiction zone causes no problems.

In the liquid film zone, heat is conducted away by means of the liquid film on the particular part of the quartz tubes, inner surface. Due to the fact that the said inner surface is covered by a liquid film a very high heat transfer sum is achieved, which is why the inner surface of the quartz tube will receive a temperature which exceeds the temperature of the liquid by only 30° C. The heat transfer in the liquid film zone is also increased by means of the rotation of the rising vapours which in this way can act jointly with the liquid dripping from the rectification zone by means of which they are thrown out against the inner surface of the quartz tube in the liquid film zone and in this way contribute to the transfer of heat.

In accordance with the above, the acid in the reservoir zone is hottest while at the same time the quantity of acid has been reduced to a minimum. By means of a direct contact between the collected acid and the particular inner surface of each quartz tube the heat transfer sum will even in this case be very high with the result that the inner surface of the particular quartz tube receives a temperature which exceeds the temperature of the liquid by only 30° C.

Due to the arrangement with a special liquid film zone and a special reservoir zone the temperature will therefor not be too high in any of the said zones in spite of the successively increased temperature and the successively reduced quantity of acid flowing down. An increased reservoir height reduces the risk of hot patches in the liquid film zone as an increased reservoir height produces a stronger boiling effect and an increased flow of liquid in the reservoir zone.

By means of a special acid reservoir zone in the lower parts of the quartz tube is won the great advantage of being able to work with a relatively low concentration level in the incoming acid. The advantages in this respect will be especially prominent if the acid contains large quantities of impurities.

BRIEF DESCRIPTION OF THE DRAWINGS

The following is a description of, at present, suggested designs for a method and apparatus in accordance with the invention and simultaneous reference to the enclosed drawings where FIG. 1—in vertical section shows in principle the design of a quartz tube in accordance with the invention, FIG. 2—is vertical view and partial section shows a central quartz tube located inside the quartz tube in accordance with FIG. 1, FIG. 3—in horizontal view seen from above shows the central tube in accordance with FIG. 2, FIGS. 4a–4b—in horizontal and side views respectively show the rotary device located on the quartz tube in accordance with FIG. 2, FIGS. 5a–5b—in horizontal and vertical section respectively show the circulatory device located on the central tube, FIG. 6—in vertical view shows in principle the plant for concentrating for example sulphuric acid and which includes an oven containing vertically arranged quartz tubes, and FIG. 7—in vertical section shows the oven in accordance with FIG. 6.

BEST MODE FOR CARRYING OUT THE INVENTION

Figure 1:
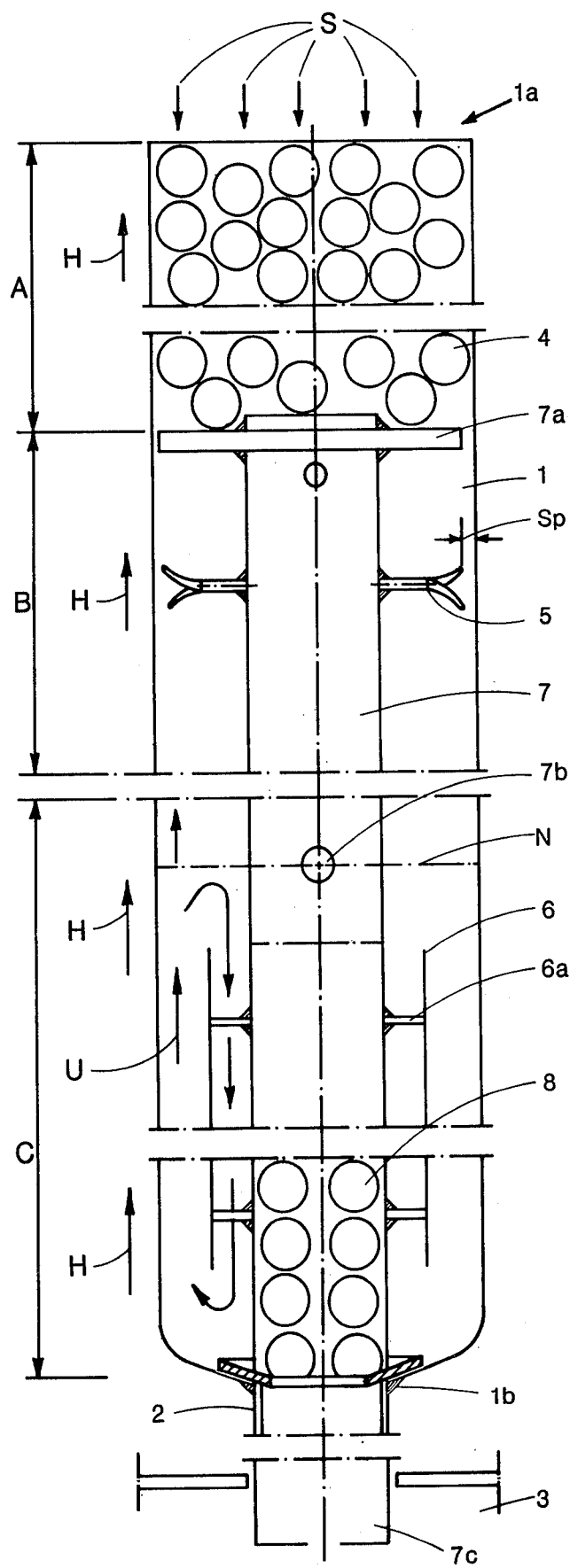

In FIG. 1 the reference number (1) indicates a quartz tube of already known type. The quartz tube can together with one or more similar quartz tubes be an integral part of a plant for concentrating mineral acids, in particular sulphuric acid. Together with the concentration even purifying can in this respect be carried out. Each quartz tube is heated on its outside preferably with the aid of hot stack gases which are generated in an oven which is an integral part of the plant. The heating by means of hot stack gases is symbolized in FIG. 1 by the arrows (H). As an alternative an element may be considered to carry out the heating, however this is not shown.

The acid which is to be concentrated in the respective quartz tube is fed in via the upper part (1a) of the quartz tube, and the said acid which in the case stated below is sulphuric acid has been indicated by the arrows (S). The said acid consequently passes through the quartz tube in a downward direction, whereupon the concentrated acid in the tube is led off via the protruding part (2) to the vessel indicated (3). During its passage down through the tube the acid concentration and temperature is increased successively, while the volume of acid is in an equivalent manner successively reduced. During the concentration process vapors or gases are driven off from the acid under its passage through the tube, and these vapors or gases rise through the tube and depart via the previously mentioned upper part of the tube.

In accordance with the invention the tube is divided into three different zones perpendicularly. Each zone extends to approximately one third of the length of the tube and in the figure they have been designated A, B, and C. The upper zone A forms a rectification zone preferably containing packings (4) of an already known type. These packings can consist of quartz and/or ceramic material, and they may be of the same or varying sizes. The rectification zone extends downwards from the upper surface of the quartz tube (1a) and in accordance with the above occupies approximately one third of the perpendicular length of the quartz tube. Examples of the dimensions of the packings are 40 mm long and 40 mm in diameter and 25 mm long and 25 mm in diameter respectively.

The central zone B forms a liquid film zone which is directly connected to the rectification zone. One or more rotary devices are located in the liquid film zone for the rotation of the vapors rising up the tube from below. The sand rotary devices can consist of one or more spray discs which are described more precisely below. The acid dripping and/or running down from rectification zone is so affected in the liquid film zone that it forms a film which runs down the inside surface of the liquid film zone.

The lower zone C forms a reservoir zone which in turn is directly connected to the liquid film zone. In this zone is collected that acid which flows down from the liquid film zone and is circulated by means of one or more circulatory devices (6) which are described more precisely below. The collected acid is boiled in the reservoir zone and the circulatory device or devices cause a circulation of the same, the said circulation being indicated by the arrows (U). Close to the inner wall of the quartz tube (1) in the reservoir zone the liquid strives upwards, while nearer the central part of the zone the flow takes place downwards.

In each quartz tube (1) is located a central located tube (7) made of quartz which includes the above-mentioned protruding tube part (2) which extends via a recess (1b) in the lower end of the quartz tube and down into the vessel (3). In this way the quartz tube (1) forms an outer tube and the central tube forms an inner tube. The central tube (7) extends inside the quartz tube up through the reservoir zone and the liquid film zone. The upper parts of the central tube are equipped with a cross-piece (7a), by means of which the central tube is located centrally in the quartz tube. The said cross-piece also functions as a lower support for the packings in the rectification zone A. Consequently the central tube has an internal through-channel to carry the rotary device (5) on its outside. In the reservoir zone, the unit (1) has a circulatory device (6) fitted to it and which consists of a tube mounted coaxially relative to the central tube. The coaxially mounted tube is fitted to the inner surface of the central tube by means of the stays (6a). The circulatory device (6) terminates with its upper end at a relatively great distance beneath the surface of the liquid (N) in the reservoir zone. In an equivalent way the lower end of the coaxially mounted tube terminates a relatively great distance from the lower end of the quartz tube. The form of the circulatory device causes the upwards flow of liquid in the reservoir zone to take place between the inner surface of the quartz tube in the reservoir zone and the outer surface of the coaxially mounted tube, while the downwards flow takes place between the outer surface of the central quartz tube and the inner surface of the coaxially mounted tube. The central quartz tube forms an overflow in the reservoir zone. The central quartz tube is namely equipped with one or more side outlets (7b) via which the surplus acid contained in the reservoir zone is led off to the inner area of the central tube. The inner area of the central quartz tube is through-connected to the vessel (3) through which the surplus acid is drained-off via the lower end surface (7c) of the central tube.

A further rectification zone (8) is located, in the shown example, in the central tube inner channel, below the said side outlet or outlets (7b).

The said rectification zone (8) comprises in this case packings which may be of similar design as the layer of packings in the rectification zone A. The said packings can consequently be of the same form, variously formed, or consist of two or more layers of different sizes.

Figure 2:
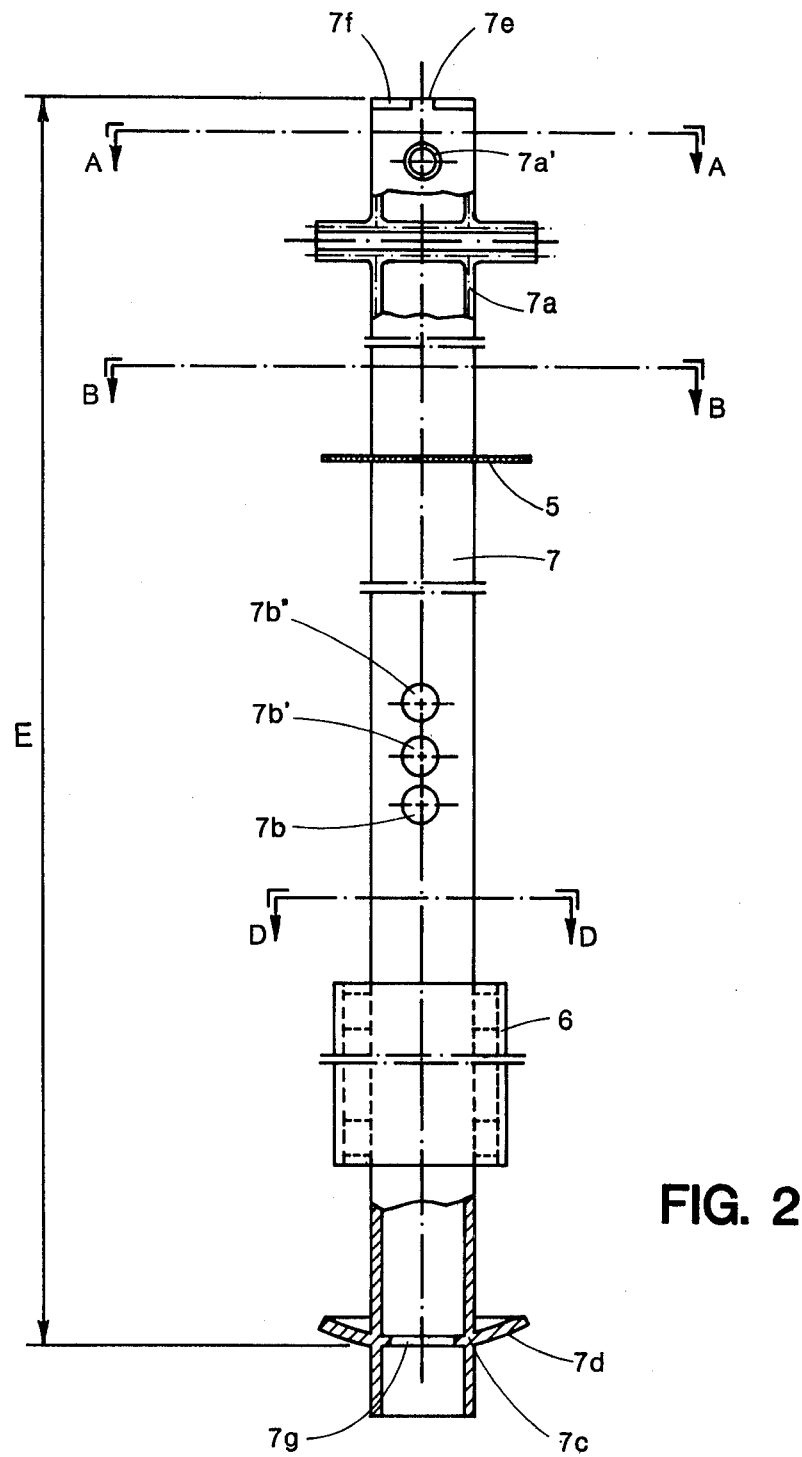

FIG. 2 shows the central tube (7) in greater detail. The central tube with all associated components (7a), (7a'), (5), and (6) mounted, consists of a tube made from quartz or a ceramic material. The cross-piece arms (7a), (7a'), the rotary device (5), and the coaxially mounted tube (6) are fusion welded to the outside of the central quartz tube. The central quartz tube has a total length, marked E, of 2.5 m. The lower end (7c) of the central tube is formed with a spherical bearing surface (7d), which in turn forms a movement absorbing, shoulder bearing for the entire tube. The bearing is located in the cover of the vessel (3). In the shown example, the central quartz tube is equipped with side outlets (7b), (7b'), and (7b'') at three different levels. At each level there are three side outlets equally distributed around the circumference of the central tube. The tube is completely hollow and exits upwards via a hole (7e) located in a cover (7f), or equivalent. In those cases where the acid collected in the vessel (3) is subjected to heat, the vapors from the vessel are led up through the tube and out via the said holes (7a) and (7b). In the lower end surface (7c) of the tube, is located an outlet (7g) positioned on the central axis of the tube and which leads into the said vessel.

Figure 3:
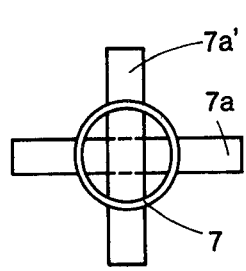

FIG. 3 shows how the cross-piece is mounted on the tube (7). The cross-piece arms (7a), and (7a') extend through diametrically placed in the wall of the central tube, through-holes, and are located at different levels relative to each other. The ends of the arms interact with the relevant inner surface of the quartz tube so that a centralizing function for the central tube is thereby created.

Figure 4B:
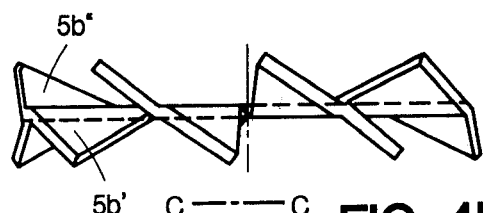
Figure 4A:
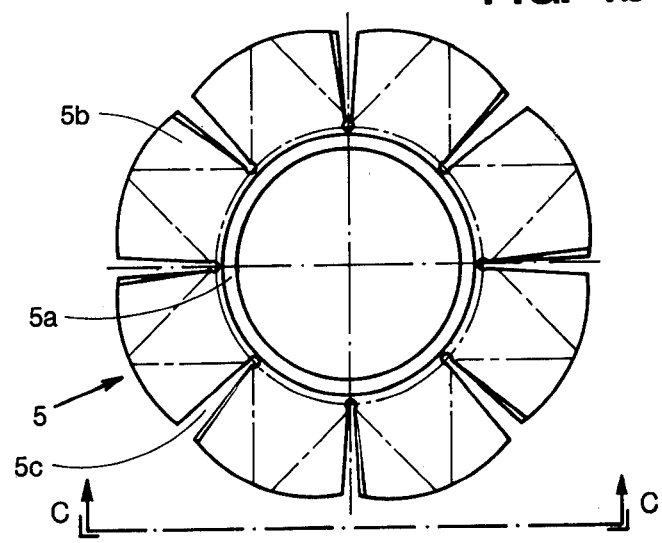

FIGS. 4a and 4b show a spray disc with associated peripheral wings. The spray disc comprises a ring-shaped hub (5a), and on it the radially outstretched wings (5b). Each wing comprises a downwards angled part (5b'), and an upwards angled part (5b''). The numer of wings shown in the example is eight, and the wings have intermediate radial slots via which the rising vapors pass through and are caused to flow in a turbulent manner.

Figure 5B:
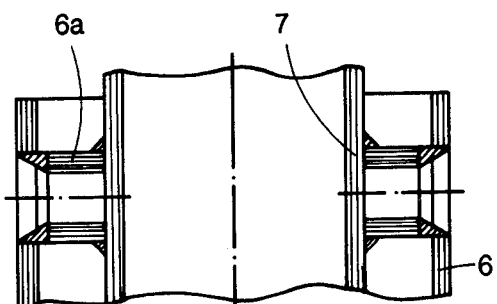
Figure 5A:
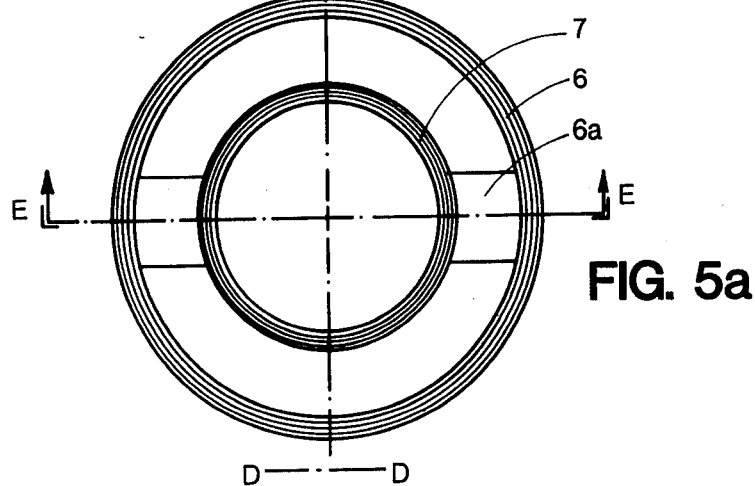

FIGS. 5a and 5b show the location of the coaxially mounted tube (6) on the central tube (7). The stay (6a) is tube shaped and is fusion welded at its ends into the recesses in the coaxially mounted tube. The other end of the said stay (6a) is fusion welded to the mantle of the central tube (7). The number of stays in the shown example is four, and in which they are fitted in pairs, at different heights, and each pair of stays extends along a common diameter at each level.

Figure 6:
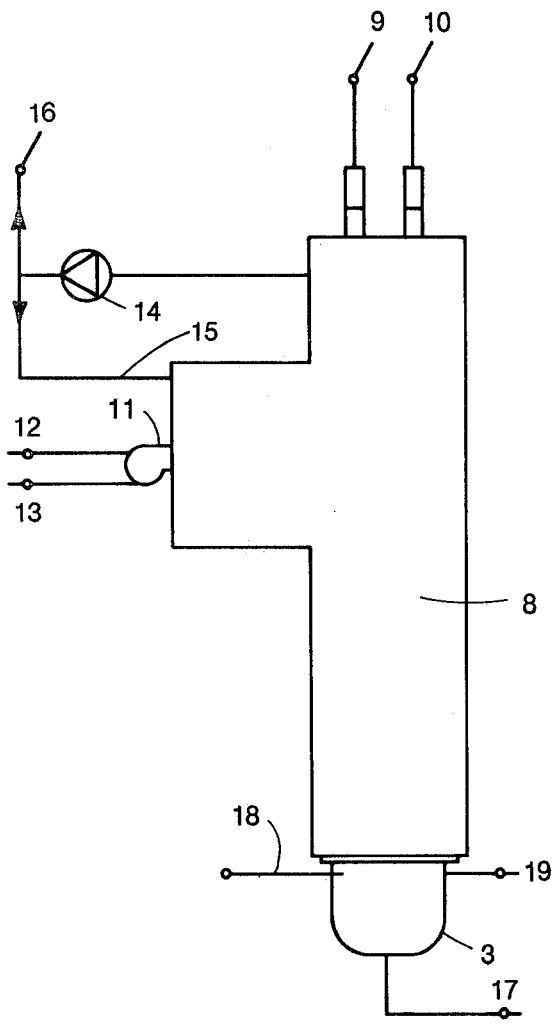

In FIG. 6, a concentration apparatus is shown in principle and indicated (8), with the collecting vessel (3) located under the said apparatus. The acid which is to be concentrated is fed in via the inlet tubes (9) and (10). The concentration apparatus comprises a heatable oven which generates hot stack gases by means of an oil burner (11), to which the heating oil and air is fed via tubes (12) and (13). An induction fan (14) is connected to the oven. The system has a return tube (15) through which some of the said hot stack gases are returned to the oven combustion chamber for the purpose of maintaining the said hot stack gases at a constant temperature. The fan (14) also supplies an air exchanger which is not shown, with stack gases via a connection (16). The said air exchanger supplies the burner (11) with a flow of air. The concentrated sulphuric acid is led from the vessel (3) via a drainage tube (17). Cold $HNO_3$ is fed in via a tube (18). A balance tube is indicated (19).

Figure 7:
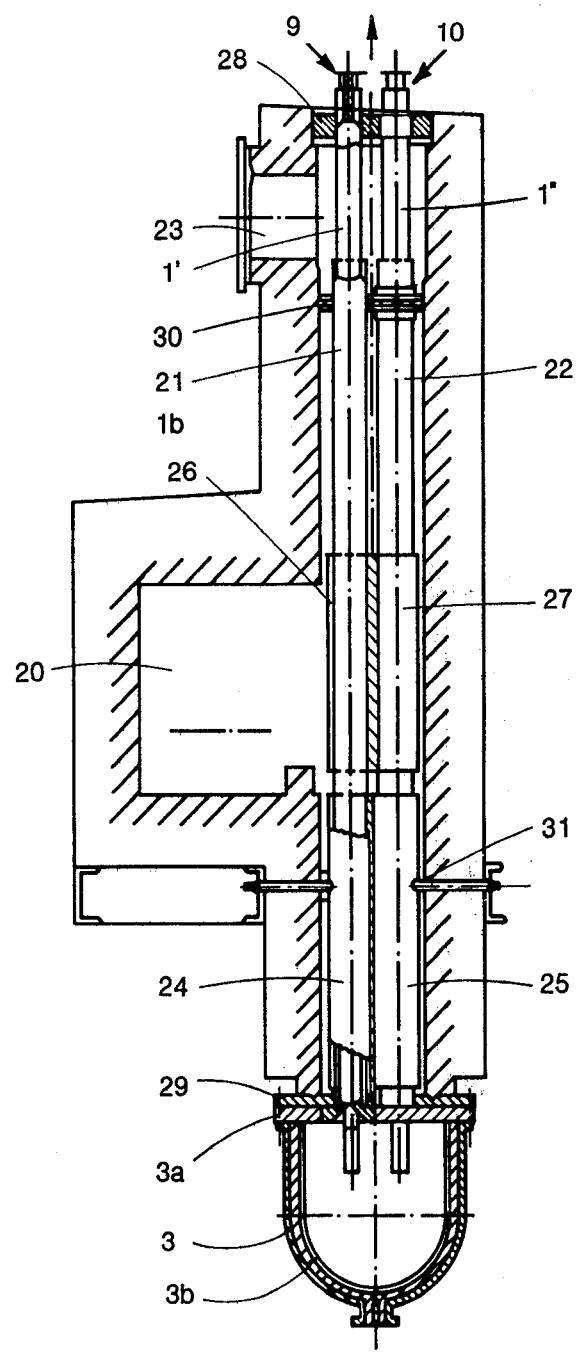

In accordance with FIG. 7 the apparatus consists of a number of quartz tubes (1'), (1''), and so on. The quartz tubes, as shown in the example, can have a length of approximately 5 m. The quartz tubes are manufactured from a material, for example transparent quartz having good heat conducting and resistance properties. Each tube has a wall thickness of 4–12 mm and weighs, for example 15–40 kg. The combustion chamber in the apparatus oven is indicated (20). The said returned hot stack gases are guided in the oven so that they arrive in front of the flame. The quartz tubes are fitted with coaxially mounted steel pillars (21) and (22) respectively, and have here been named inner steel pillars. These inner steel pillars extend from the lower part of the tube up to a height level with the outlet (23) to the fan (14). The lower parts of the quartz tubes are fitted with outer steel pillars (24) and (25) respectively. These latter steel pillars extend from the lower parts of the quartz tubes up to a height level with the oven furnace (20). At those parts of the tubes which extend past the oven furnace (20) the inner steel pillars are fitted with flame protectors (26) and (27) respectively.

The quartz tubes (1'), (1''), and the inner and outer steel pillars are so arranged that they have intermediate spacings, through which the hot gases generated in the combustion chamber (20) are guided in a special manner with the aid of the fan (14). In this way the hot stack gases pass through the outer spacings between the outer and inner steel pillars towards the lower parts of the quartz tubes where openings are located in the inner steel pillars in order that the said gases may be led into the inner spacings between the inner steel pillars and the outsides of the quartz tubes in order that the said gases come into direct contact with the outsides of the quartz tubes. The hot stack gases are guided from the lower parts of the quartz tubes up and along the outsides of the quartz tubes to the outlet (23). Through the shown example of the arrangement a reverse flow convection is achieved at the lower parts of the tubes which contributes to an even heat transfer between the hot stack gases and the acid running down the inside of the quartz tube. The quartz tubes with associated steel pillars are arranged vertically in the oven and are sealed at the upper part of the oven by means of seals (28) and at the lower end of the oven by seals (29). In accordance with FIG. 7 the vessel (3) is fitted with a sealing cover (3a), through which the lower ends of the quartz tubes pass, and are sealed off at the said cover by means of seals. In this way the interior of the vessel (3) is connected to the interiors of the quartz tubes via the overflow described above, in each quartz tube. The vessel, such as is shown in FIG. 7, can be fitted with an internal electric-heating element, by means of which the surplus acid in the vessel can be heated even more. The quartz tubes are also held fast by guides (30) and (31), which retain the tubes and their associated steel pillars in a vertical position. The bearings for the tubes are such that their entire weight rests on the cover (3a), while the lateral support is provided by, among other things, the guides (30) and (31).

The concentration of, for example sulphuric acid, takes place in the above described quartz tube in the following manner. It is assumed that 60% pure sulphuric acid is to be concentrated to 95%. In the upper or rectification zone A, the sulphuric acid S will be concentrated to approximately 70%. At the top of the quartz tube the acid has a temperature of approximately 140° C., and the departing vapor has a temperature slightly higher than 140° C. The acid which leaves the rectification zone has a temperature of approximately 165° C. The rising vapor which reaches the layer of packings (4) spreads the acid in the layer of packings so that the inner surface of the quartz tube within the layer of packings is kept moist. The various perameters and construction of the layer of packings shall in this regard be so selected that the speed of the vapor rising in the layer of packings is 2-3 m/s. The quantity of liquid which departs from the rectification zone has reduced to approximately 85% of the quantity of acid added.

In accordance with the above the flow of the vapors rising in the liquid film zone is caused to be turbulent by means of the aforementioned spray disc. The flow of rising vapors is caused to be turbulent by the said angled wings on the spray disc, whereupon the drops of liquid falling from the rectification zone are broken up and thrown against the inner surface of the quartz tube in the liquid film zone by the said turbulantly flowing vapors, where they further disintegrate and mix with acid which runs down the inner surface of the liquid film zone, from the rectification zone. In order to achieve an even film in the liquid film zone, the continued liquid volume in the liquid film zone must not be too little. Further, the liquid should preferably be spread evenly over the inner surface. The speed of the rising vapor in the space (Sp) between the outer diameter of the spray disc over the said wings and the relevant inner surface of the quartz tube and between the spaces (5c) in the wings, is in the shown example 4-6 m/s. The concentration process in the film zone increases the concentration to approximately 85%. The quantity of liquid is reduced to approximately 75% relative to the quantity of acid added.

Due to the quantity of liquid being sufficient, the liquid film on the relevant inner surface of the quartz tube is not broken. In this way the risk of having to conduct away heat generated by the vapor flow and captivated drops of liquid from surfaces or patches of surfaces not covered by the liquid film, which could cause problems if the temperature on the said vapor heat conducted surfaces or patches on the inner surfaces of the tubes exceeds the boiling point of sulphuric acid of 338° C. In that case the captivated drops of liquid tend to completely gasify, permitting those salts which as a rule exist in small quantities in the acid, to be deposited and form a coating on the surfaces of the quartz tubes. Such coatings would cause hot patches to occur which in turn tend to cause tensions in the quartz tube, consequently causing fractures and breaks. In the event of a somewhat broken film of liquid in the liquid film zone the temperature should therefore not be too high.

In the lower part of the quartz tube where the quantity of acid is least, and the acid temperature and concentration is greatest, the risk of hot patches is eliminated due to the acid collecting in the reservoir zone. The boiling-off of the vapour in combination with the coaxially mounted circulatory device (6) ensures that the collected acid is kept in an even circulation in this zone. Due to circulation of the liquid, surge boiling and hammering can be avoided.

The acid is led from the reservoir zone C through the side outlet (7b) in the central tube (7). The acid will boil around the inner surface of the quartz tube, whereupon an upward flow of liquid is achieved along the length of the zone simultaneously as a downward liquid flow takes place between the circulatory device and the central quartz tube. An increased reservoir height reduces the risk of hot patches occurring in the liquid film zone.

The entering stack gases have a temperature of between 700° C. and 800° C. and the departing stack gases have a temperature of approximately 400° C.

Alternatively the heating can be carried out electrically. With electric heating, the heat supply from the outside of the quartz tube to the different zones can be controlled so that a good heat transfer is achieved.

The concentrated acid from one or more quartz tubes as in FIG. 1 can collect in the vessel (3) which may be manufactured from cast iron or silicon iron. If a small amount of heat is introduced by, for example the said electric elements (3b), to the vessel (3), the concentration in the reservoir zone is reduced in spite of the fact that the same output effect is achieved from the apparatus as a whole. This is an advantage if the concentration process is conducted so that solid substances in the acid tend to be deposited. In the latter case a layer of packings can be located inside the central quartz tube (7) as has been described above. The departing surplus acid from the reservoir zone then meets gas departing from the vessel, whereupon some of the sulphuric acid contained in the gas is washed out. The layer of packings contributes therefore to the reduction of the need for concentration in the quartz tube, which is why a relatively lower temperature can be achieved in the same.

During concentration the quantity of acid which can be added is dependent on the concentration of the incoming acid, especially in those cases where a specific final concentration is to be achieved. Due to the collecting of acid in the bottom a much lower incoming concentration can be used than would otherwise be the case. This is especially the case if the acid contains greater quantities of impurities.

The invention is not limited to the above forms of process as shown in the example, but may be subjected to modifications within the framework of the patent claims which follow and the intention of the invention.

INDUSTRIAL USE

The above suggested construction based on a quartz tube, and usable in connection with the concentration, and if desired, purification of mineral acids, permits a fabrication where it is easy to manufacture and assemble the various units in series production for the erection of plants on site.

I claim:

1. Apparatus for the concentration of a mineral acid which comprises at least one externally heatable quartz tube having inlet means at the upper end thereof which is for the mineral acid to be concentrated, outlet means at the lower part thereof for draining off concentrated mineral acid; and outlet means at the upper part of the tube for removing rising vapors from the mineral acid; wherein said quartz tube includes an upper rectification zone, a center liquid film zone, and a lower reservoir zone; wherein said rectification zone includes means for providing a well moistened inner surface during use which is dependent upon the quantity of acid supplied, rate of rising vapors in said rectification zone, and vapors temperatures; said liquid film zone contains at least one device for causing turbulent flow of the vapors rising in the liquid film zone so that said vapors due to their turbulence and rate of ascent cause a coaction with the acid drops falling from said upper rectification zone whereby said acid drops disintegrate and are thrown against the inner surface of the quartz tube in the liquid film zone wherein they disintegrate further and mix with acid running down the inner surface of said quartz tube forming an essentially unbroken liquid film; and wherein said reservoir zone includes means for collecting acid running down from said liquid film zone and contains at least one circulatory device for controllably circulating collected acid during the boiling of collected acid and further contains overflow means for removing surplus concentrated acid.

2. The apparatus of claim 1 wherein each of the three zones extends to approximately one third of the length of the quartz tube.

3. The apparatus of claim 1 wherein said circulatory device includes a central quartz tube and a coaxially mounted tube located on the central quartz tube which via its upper and lower ends, terminates at a distance from the upper and lower ends respectively of said reservoir zone for creating a downward flow between the central quartz tube and the coaxially mounted tube, and an upward flow between the heatable quartz tube and coaxially mounted tube.

4. The apparatus of claim 1 wherein said upper rectification zone contains packings.

5. The apparatus of claim 4 wherein said heatable quartz tube contains an internal quartz central tube extending from the upper part of the heatable quartz tube into said liquid film zone, and supporting said device for causing turbulent flow of the vapors, said circulatory device, and said packings; and wherein said quartz central tube contains at least one through side outlet and an inner channel in the lower part thereof.

6. The apparatus of claim 5 wherein each of the three zones extends to approximately one-third of the length of the heatable quartz tube.

7. The apparatus of claim 5 wherein said device for causing turbulent flow of the vapors comprises at least one vertically arranged spray disc containing angled wings located around its periphery wherein the diameter of said disc above said wings is selected based upon the inner diameter of said heatable quartz tube, acid quantity, and vapor temperatures such that the rising vapors attain a rate of flow of 4–6 m/s.

8. The apparatus of claim 7 wherein each of the three zones extends to approximately one-third of the length of the heatable quartz tube.

9. The apparatus of claim 5 wherein said circulatory device includes a coaxially mounted tube located on the central quartz tube which via its upper and lower ends, terminates at a distance from the upper and lower ends respectively of said reservoir zone for creating a downward flow between the central tube and the coaxially mounted tube, and an upward flow between the heatable quartz tube and coaxially mounted tube.

10. the apparatus of claim 9 which further comprises an additional rectification zone located inside said central quartz tube and under the side outlet which acts as an overflow.

11. The apparatus of claim 10 wherein said additional rectification zone comprises packings.

12. The apparatus of claim 11 wherein each of said three zones extends to approximately one-third of the length of the heatable quartz tube.

13. The apparatus of claim 7 wherein said circulatory device includes a coaxially mounted tube located on the central quartz tube which via its upper and lower ends, terminates at a distance from the upper and lower ends respectively of said reservoir zone for creating a downward flow between the central tube and the coaxially mounted tube, and an upward flow between the heatable quartz tube and coaxially mounted tube.

14. The apparatus of claim 13 which further comprises an additional rectification zone located inside said central quartz tube and under the side outlet which acts as an overflow.

15. The apparatus of claim 14 wherein said additional rectification zone comprises packings.

16. The apparatus of claim 15 wherein each of said three zones extends to approximately one-third of the length of the heatable quartz tube.

17. The apparatus of claim 5 which further comprises an additional rectification zone located inside said central quartz tube and under the side outlet which acts as an overflow.

18. The apparatus of claim 17 wherein said additional recitification zone comprises packings.

19. The apparatus of claim 18 wherein each of said three zones extends to approximately one-third of the length of the heatable quartz tube.

* * * * *